Aug. 11, 1953 J. M. MELICK 2,648,830
SELECTIVE PLURAL DIGIT INDICATOR
Filed Feb. 11, 1950 5 Sheets-Sheet 1

INVENTOR
J. M. MELICK
BY
J. W. Schmied
ATTORNEY

Aug. 11, 1953   J. M. MELICK   2,648,830
SELECTIVE PLURAL DIGIT INDICATOR
Filed Feb. 11, 1950   5 Sheets-Sheet 2

INVENTOR
J. M. MELICK
BY
ATTORNEY

Aug. 11, 1953      J. M. MELICK      2,648,830
SELECTIVE PLURAL DIGIT INDICATOR
Filed Feb. 11, 1950      5 Sheets-Sheet 3
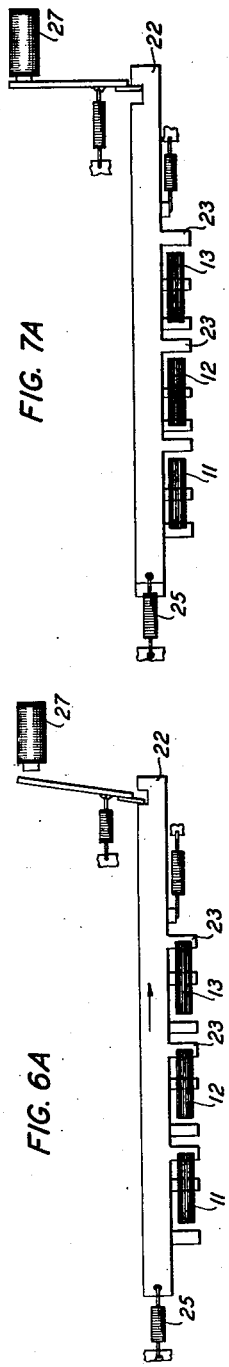
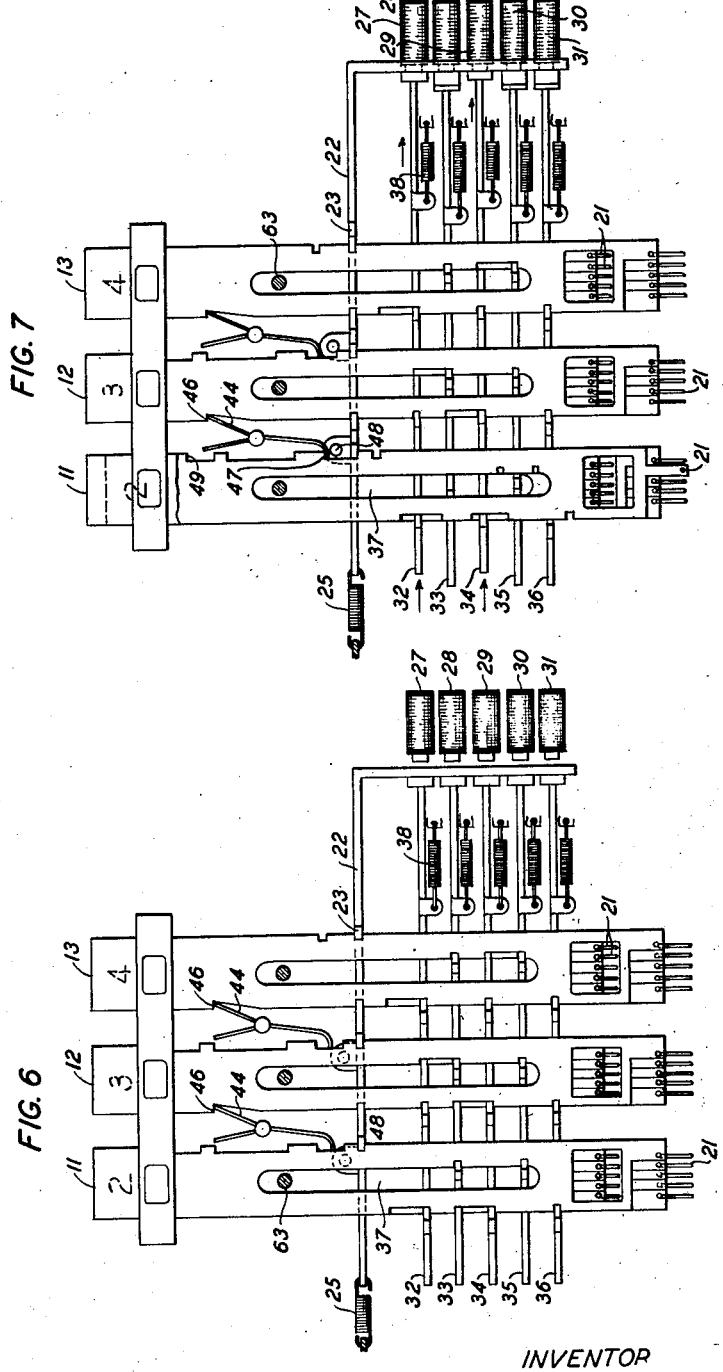
INVENTOR
J. M. MELICK
BY
J. W. Schmied
ATTORNEY Aug. 11, 1953 — J. M. MELICK — 2,648,830
SELECTIVE PLURAL DIGIT INDICATOR
Filed Feb. 11, 1950 — 5 Sheets-Sheet 4
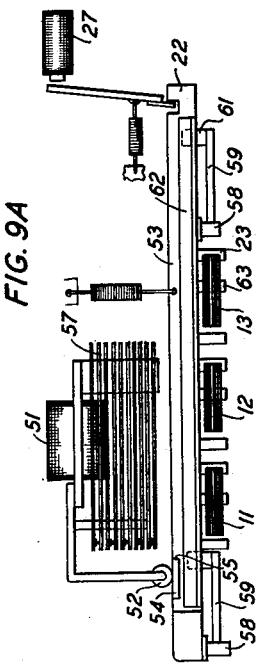
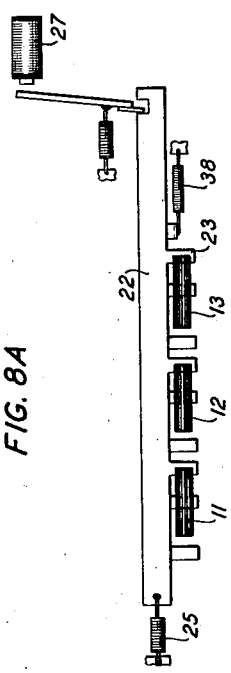
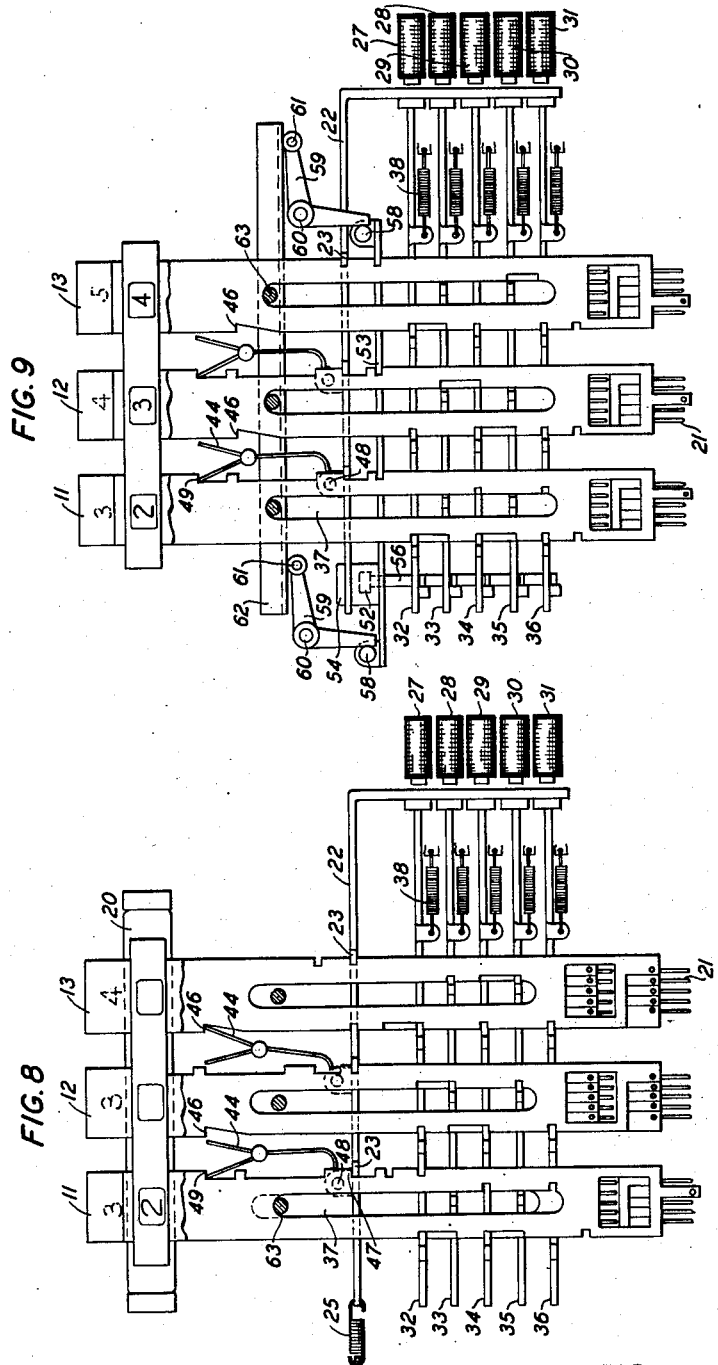
INVENTOR
J. M. MELICK
BY
J. W. Schmied
ATTORNEY Aug. 11, 1953   J. M. MELICK   2,648,830
SELECTIVE PLURAL DIGIT INDICATOR
Filed Feb. 11, 1950   5 Sheets—Sheet 5
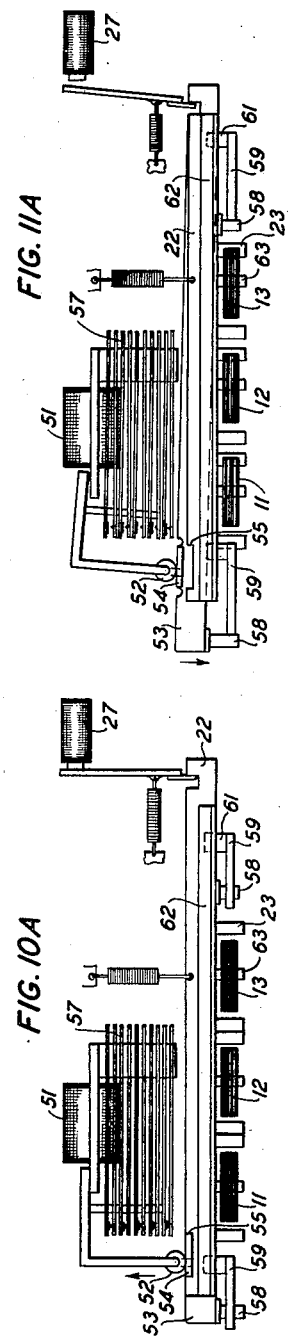
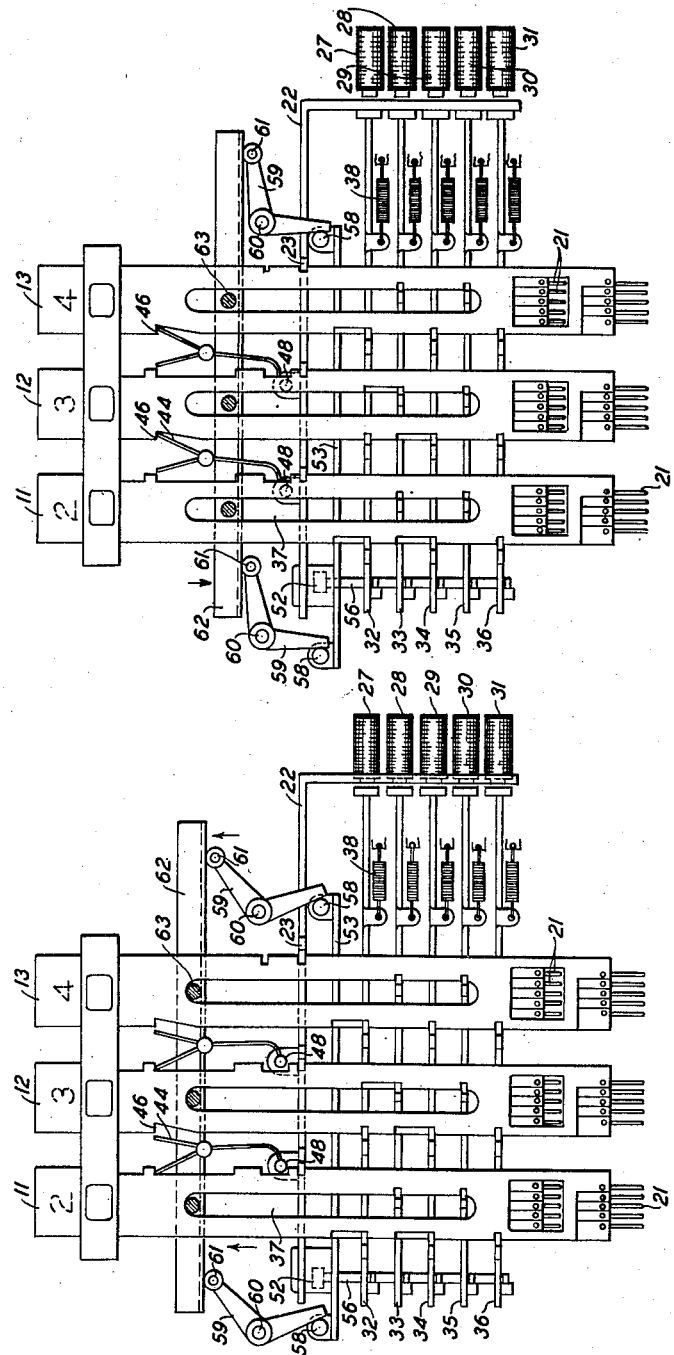
INVENTOR
J. M. MELICK
BY
*J. W. Schmid*
ATTORNEY Patented Aug. 11, 1953

2,648,830

UNITED STATES PATENT OFFICE 2,648,830

SELECTIVE PLURAL DIGIT INDICATOR

John M. Melick, Cresskill, N. J., assignor to Bell Telephone Laboratories, Incorporated, New York, N. Y., a corporation of New York Application February 11, 1950, Serial No. 143,768

15 Claims. (Cl. 340—154)

This invention relates to digit recorders and more particularly to a visual display type digital indicator.

An object of this invention is to provide a digit recorder of efficient operation and of reduced cost of manufacture.

Another object of this invention is to provide a digit recorder in which a series of elemental digital indicators are successively operated by a selective means common thereto.

A further object of this invention is to provide a digital indicator with certain parts thereof performing a dual function of selection and restoral.

In general, the invention may be used wherever electrical digital representations are to be converted into a visual display of the represented digits. For example, in telephone switching systems, call indicators are frequently employed to convert the digital representation transmitted from an automatic switching system office to a visual display in a manual switching system office.

In the preferred embodiment of the invention, ten transparent, sequentially numbered cards are provided for each digit. The cards for each digit are arranged in stacked relationship and are normally positioned so that the numbers engraved thereon cannot be read. A single set of five code bars selectively operable under the control of a single set of five electromagnets is common to all of the groups of number cards. The initial energization of two of the five electromagnets will permit the selected one of the cards in the first group of cards to be partially displaced, but means are provided to prevent any card in the other groups of cards from being displaced at this time. Upon the release of the operated electromagnets, the selected card is fully displaced to the reading position, the remaining first digit cards are locked in a non-reading position and the second group of cards are prepared for selective displacement upon the next energization of two of the five electromagnets, and so forth. Means are provided for restoring the apparatus to normal upon the completion of the recording and after the information displayed by the system has fulfilled its function.

A more complete understanding of the above-mentioned and other features of the invention may be obtained from the following detailed description of a preferred embodiment of the invention when read with reference to the accompanying drawings in which:

Figs. 6 to 11 are front operational schematic views of the structure of Fig. 1; and Figs. 6A to 11A are top operational schematic views of the structure of Fig. 1.

Figure 2:
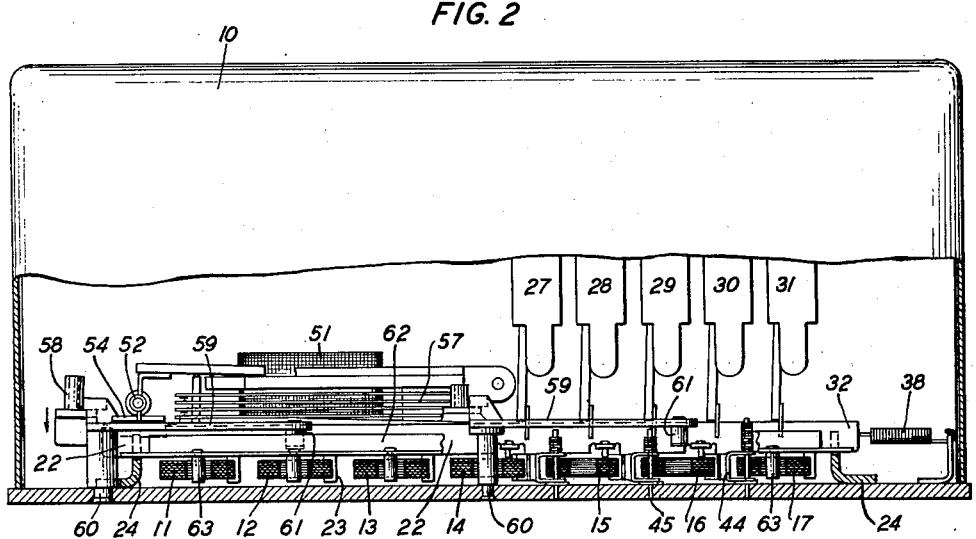
Fig. 2 is a top view of the structure of Fig. 1, with the front half thereof being shown through 2—2 of Fig. 1.
Figure 1:
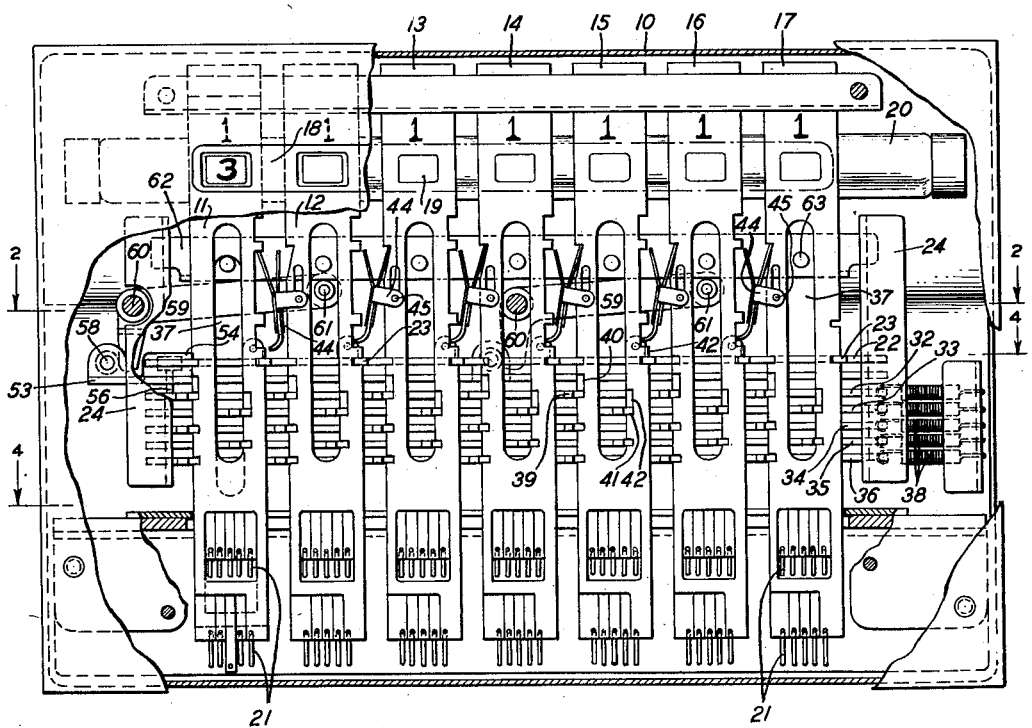
Fig. 1 shows a front view of a digit recording apparatus constructed in accordance with the principles of the invention, with a portion of the cover cut away.
Figure 3:
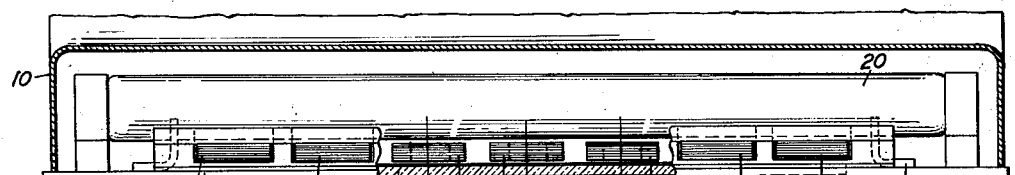
Fig. 3 is a partially cut away top view of the front portion of the structure of Fig. 1, with the top part of the cover removed.
Figure 4:
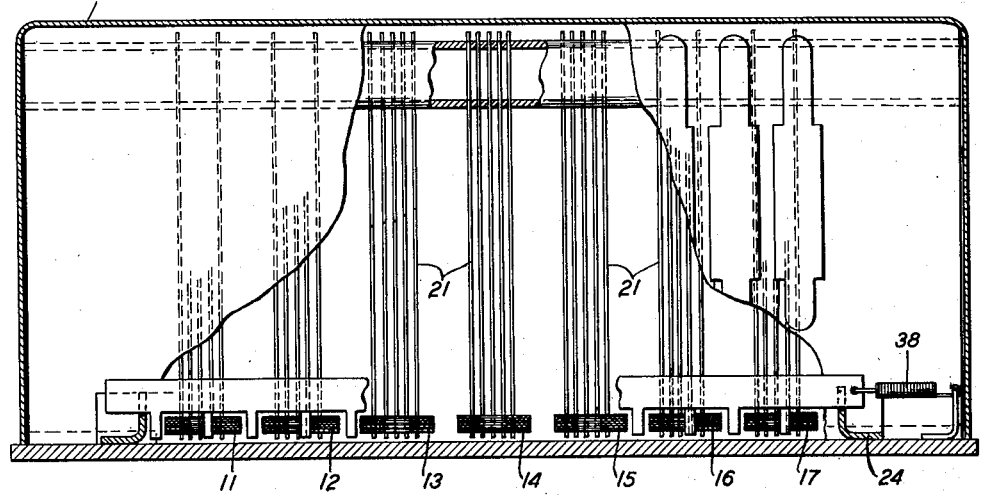
Fig. 4 is a top view of the structure of Fig. 1 partially cut away to show a view through 4—4 of Fig. 1.
Figure 5:
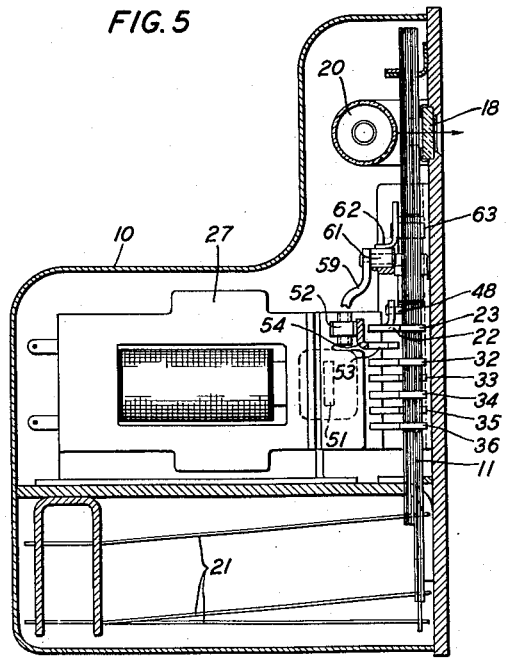
Fig. 5 is a side view of the structure of Fig. 1 with the side cover removed.

Referring now to Figs. 1 through 5, the indicator mechanism is mounted within a suitable protective cover 10 having a front portion 18 of transparent material. With an assumed seven-digit number, seven groups of indicator cards 11 to 17 are provided to record the first to seventh digits, respectively. Each of these groups of cards comprises ten cards in stacked relationship. Each card may either be of transparent material, or, as shown, may be provided with an aperture 19 therein (Fig. 1). Immediately above this aperture a number is printed on the card, with the cards being numbered sequentially from one to zero. The cards are normally positioned with the apertures 19 of all of the cards in the group in alignment with each other, with the transparent portion 18 of the cover 10, and with a lamp 20 whereby the light may be seen through the apertures 19, as is best shown in Figs. 1, 3 and 5.

A downward force is exerted on each of the cards by an individual spring 21 (Figs. 1, 4 and 5), and the cards are suitably apertured and notched and the springs 21 suitably located so that each card may be moved downwardly under the action of the spring 21 individual thereto without interference from the remaining cards or springs.

Three separate means, however, may individually or cooperatively prevent any card or any one group of cards from moving downwardly into the reading position.

The first of these means is a locking bar 22. This bar extends horizontally and is provided with a plurality of projections 23 which engage notches in the right-hand edges of all of the cards in each of the groups 11 to 17 whereby no card may be displaced vertically until the locking bar 22 is displaced laterally. This bar is supported by brackets 24 and is normally biased to the left by a spring 25 (Fig. 6). It is movable to the right upon the operation of any one of the five electromagnets 27 to 31, the armature of each of those magnets engaging notches at the edge of locking bar 22 (Figs. 2 and 5).

The second means operative to prevent the vertical displacement of the number cards is a series of code bars 32 to 36 each having a plurality of projections extending forwardly of the plane of the front number card in each group and appearing either spaced from the left edges of the number cards or extending through large central apertures 37 in those cards. Each of the cards is provided with a series of notches along its two left-hand edges in alignment with all or some of these code bars 32 to 36. As will be seen hereinafter, some of these notches are of a width substantially equal to the thickness of the code bar projections, while others are of substantially greater width.

The code bars 32 to 36 are slidably supported by brackets 24, are biased to the right by springs 38, and are normally held to the left by the electromagnets 27 to 31. Although any suitable arrangement may be employed, in the disclosed preferred embodiment of the invention, the armature of electromagnet 27 engages a notch in code bar 32 only, the armature of electromagnet 28 engages a notch in code bar 33 only, and electromagnets 29, 30 and 31 are similarly individually associated with the code bars 34, 35 and 36, respectively. Upon the energization of any of these electromagnets, the associated code bars are permitted to move laterally to the right under the force exerted by the associated individual springs 38 whereby the projections on the code bars engage narrow or wide notches in the number cards in the groups 11 to 17. The electromagnets 27 to 31, and therefore the code bars 32 to 36, are herein assumed to be operated on a two-out-of-five code basis. Therefore, the notches in the number cards are suitably arranged so that upon the energization of two of the five electromagnets, representing a certain digit, the one card in each of the groups 11 to 17 bearing that digital notation will be free to move downwardly while all other cards in each of the groups will be prevented from being displaced. Thus in accordance with one conventional system, the cards in each group may be notched so that the cards bearing the following digital notations will be displaced upon the energization of the following electromagnets and upon the consequent movement of the following code bars:

| Number Card | Magnets | Code Bars |
| --- | --- | --- |
| 1 | 27, 28 | 32, 33 |
| 2 | 27, 29 | 32, 34 |
| 3 | 28, 29 | 33, 34 |
| 4 | 27, 30 | 32, 35 |
| 5 | 28, 30 | 33, 35 |
| 6 | 29, 30 | 34, 35 |
| 7 | 27, 31 | 32, 36 |
| 8 | 28, 31 | 33, 36 |
| 9 | 29, 31 | 34, 36 |
| 0 | 30, 31 | 35, 36 |

Thus, in Fig. 1, the No. 1 card in each group 11 to 17 is assumed to be at the front. With reference to group 15, if code bar 32 be moved laterally to the right, projection 39 will engage large notch 40 and will not inhibit the downward movement of the No. 1 card; if code bar 33 be moved to the right, projection 41 will engage large notch 42 and will also not inhibit the downward movement of the No. 1 card; but if any of the other code bars 34 to 36 are moved laterally, the projections thereon will engage narrow notches in the No. 1 card and downward movement of that card will be prevented.

Since, as will be seen hereinafter, both the locking bar 22 and two of the five code bars 32 to 36 are moved to the right in the process of registering each digit, means are provided for preventing the displacement of any card in any but that one of the digit groups 11 to 17 next to be employed. This means comprises a plurality of substantially Y-shaped latch members 44 which are pivotally mounted about pins 45. As will be described in detail hereinafter, each of these latches is normally positioned to prevent any card in any but the first group 11 to be displaced. Upon the selective displacement of one of the cards in the first digital group, the latch 44 intermediate the first digital group 11 and the second digital group 12 is moved to a position as shown in Fig. 1 whereby the remaining cards in the first group are thereafter locked in their normal non-displaced positions and the cards of the second digital group 12 are released for selective displacement.

Referring now to the operational schematic drawings, Figs. 6 and 6A show front and top views, respectively, of a portion of the apparatus in its normal unoperated position, with the cards of all groups locked by the locking bar 22 and with the cards of the second and third digital groups 12 and 13 locked by the engagement of the right-hand bifurcations of latches 44 engaging projections 46 on all of the cards in those groups.

Let it now be assumed that magnets 27 and 29 are operated to cause the digit "2" to be recorded by the first digital group 11. Upon the operation of any one or more of the magnets 27 to 31, the locking bar 22 is moved to the right to the position shown in Figs. 7 and 7A whereby projections 23 no longer engage any of the cards. In addition, upon the operation of magnets 27 and 29, code bars 32 and 34 are moved to the right by springs 38. For purposes of clarity, the No. 1 card of group 11, the Nos. 1 and 2 cards of group 12, and the Nos. 1, 2 and 3 cards of group 13 are assumed to have been removed. The projections on the code bars 32 and 34 engage wide slots in the No. 2 card of group 11 and a projection on at least one of these two bars engages a narrow slot in each of the remaining cards in group 11. Therefore, card No. 2 will move downwardly under the action of its associated spring 21 until the projection 47 on that card strikes the hook portion of latch 44, as shown in Fig. 7. This hook portion is prevented from being rotated counter-clockwise by pin 48 which is mounted on the locking bar 22. It may be noted that at this time the selected card has moved only through a portion of its travel, as is shown in Fig. 7.

Referring now to Figs. 8 and 8A, at the release of the operated electromagnets 27 and 29, code bars 32 and 34 are again returned to the left to their normal positions and locking bar 22 is moved to the left by spring 25. The locking bar projections 23 again engage notches in all but the selected card to lock those cards. The slot in the selected card is sufficiently wide so that the locking bar 22 may not impede the further downward movement of that card. When the locking bar 22 moves to the left, the pins 48 are carried therewith, releasing the latch 44. The projection 47 on the selected card therefore cams the latch 44 and the selected card completes its travel to the reading position. The selected numeral "2" is illuminated by lamp 20.

The counter-clockwise camming of the latch 44 results in the left-hand bifurcation thereof engaging projections 49 to restrain any others of the cards in the first digital group 11 from being subsequently displaced, and causes the right-hand bifurcation thereof to disengage projections 46 whereby a card in the second digital group 12 may be selectively displaced. The magnets 28 and 29 are then operated and released to record the digit "3," momentarily traversing locking bar 22 and code bars 33 and 34 to the right and back to the left whereby the No. 3 digit card of the second digital group 12 is selectively displaced to a reading position and the latch 44 associated with the cards of the second and third digital groups 12 and 13 is cammed counter-clockwise to lock the remaining cards of the second digital group 12 and to prepare the cards of the third digital group 13 to be selectively displaced. The apparatus continues to function in this fashion until the received number is recorded in a reading position.

Referring again to Figs. 1, 2 and 5, after the information recorded has been used, the apparatus is restored to normal by the operation of magnet 51. This operates the restoral apparatus which comprises a roller 52 integral with the armature of restoring magnet 51, a restoral bar 53, a restoral member 62, bell crank 59, and a code bar locking bracket 56.

Referring to the operational sketches of Figs. 9 and 9A, upon the energization of electromagnet 51, roller 52 moves restoral bar 53 forwardly to cause projection 54 on that bar to engage notch 55 in the locking bar 22. (Reference may be made to Fig. 11A for a view of these elements disengaged.)

A bracket 56 (Fig. 9) is affixed to the armature of electromagnet 51 and depends downwardly therefrom. Upon the energization of that electromagnet, this bracket engages notches in the code bars 32 to 36 to lock those code bars in their normal position.

Referring now to Figs. 10 and 10A, upon the energization of electromagnet 51, a plurality of sets of contacts 57 are actuated and these contacts close circuits (not shown) to energize all of the electromagnets 27 to 31. The operation of these five electromagnets draws the locking bar 22 to the right as above described. Since the locking bar 22 and the restoral bar 53 have been interlocked by the operation of electromagnet 51, the restoral bar 53 will also be moved to the right under the force exerted by all five electromagnets 27 to 31. A force is thereby exerted by pins 58, integral with the restoral bar 53, on the lower arms of bell cranks 59 which are pivotally mounted about pins 60. (It may be noted that for purposes of clarity, in the operational schematics of Figs. 9, 9A, 10, 10A, 11 and 11A the bell cranks 59 have been shown to be mounted at the front of the apparatus rather than behind the number cards as is shown in Figs. 1, 2 and 5.) The bell cranks 59 will thereby be rotated and pins 61 mounted at the extremes of the upper arms of those bell cranks will exert an upward force on the restoral member 62 and that member will be displaced upwardly to the position shown in Fig. 10. Pins 63 on restoral member 62 engage the upper edges of apertures in all of the displaced number cards to raise all of the displaced cards to their normal positions. It may be noted that none of the above-described holding means is operative at this time to prevent this upward movement of the number cards. The locking bar 22 has been displaced to the right, the code bars 32 to 36 have been held to the left by bracket 56, and the latches 44 are flexible and are cammed out of the way by the upward movement of the displaced number cards.

Upon the deenergization of electromagnet 51, the electromagnets 27 to 31 are also released, the locking bar returns to the left as does the restoral bar 53, the bell cranks restore permitting the restoral member 62 to return to its normal position, the restoral bar 53 is disassociated from the locking bar 22 and the bracket 56 moves rearwardly to release the code bars 32 to 36 and the apparatus is restored to its normal condition as shown in Figs. 11 and 11A. The number cards are then held by the previously described means in preparation for the next recordation of received digits.

It is believed to be apparent that the system may readily be expanded or contracted to provide for the registration of any required number of digits. The disclosed two-out-of-five code basis is but exemplary, and decimal or other bases may be used.

It is to be understood that the above-described arrangements are but illustrative of the application of the principles of the invention. Numerous other arrangements may be devised by those skilled in the art without departing from the spirit and scope of the invention.

What is claimed is:

1. In a digit recording apparatus, a plurality of groups of cards, a series of code bars for selecting one of the cards in each of said groups of cards, means for selectively operating said code bars, and means controlled by said code bar operating means for successively permitting the selected card in successive ones of said groups of cards to be displaced.

2. In a digit recording apparatus, a plurality of groups of cards, unitary means for selecting one of the cards in each of said groups of cards, and means normally permitting the displacement of the selected card in the first of said groups only and operative in response to the displacement of a card in said first group for permitting the selective displacement of a card in the second of said groups.

3. In a digit recording apparatus, a plurality of groups of cards, unitary means for selecting one of the cards in each of said groups of cards, and means permitting the displacement of the selected card in the first of said groups only and operative in response to the displacement of a card in said first group for permitting the selective displacement of a card in the second of said groups, and for thereafter preventing the displacement of any other card in said first group.

4. In a digit recording apparatus, two groups of cards, means common to said groups for selecting one of the cards in each of said groups, and latching means normally preventing the selective displacement of any of the cards in said second group and operative in response to the selective displacement of a card in said first group for thereafter permitting the selective displacement of one of said second group of cards.

5. In a digit recording apparatus, a plurality of groups of cards, means common to said groups for selecting one of the cards in each of said groups, and latching means common to adjacent one of said groups of cards and operative in response to the selective displacement of a card in one of said adjacent groups for thereafter permitting the selective displacement of a card in the other of said adjacent groups.

6. In a digit recording apparatus, a plurality of groups of cards, means common to said groups for selecting one of the cards in each of said groups, and latching means common to adjacent one of said groups of cards and operative in response to the selective displacement of a card in one of said adjacent groups for thereafter permitting the selective displacement of a card in the other of said adjacent groups, and for thereafter preventing the displacement of any other card in said one of said adjacent groups.

7. In a digit recording apparatus, a plurality of groups of cards, selecting means common to said groups for selecting one of the cards in each of said groups, locking means normally preventing the displacement of any of the cards in any of said groups and means controlled by said selecting means for releasing said locking means to permit the selective displacement of said cards.

8. In a digit recording apparatus, a plurality of groups of cards, selecting means operable to select one of the cards in each of said groups, locking means normally locking said cards, means controlled by said selecting means for releasing said locking means, and means controlled by said locking means for successively permitting the selected cards in the successive ones of said groups to be displaced.

9. In a digit recording apparatus, a plurality of groups of cards, selecting means operable to select one of the cards in each of said groups, locking means normally locking said cards and operative in response to said selecting means for releasing said cards, and latching means operative in response to said locking means and to the displacement of a card in the first of said groups for successively permitting the cards in the successive ones of said groups to be selectively displaced.

10. In a digit recording apparatus, a plurality of groups of cards, selecting means operable to select one of the cards in each of said groups, locking means normally locking said cards and operative in response to said selecting means for releasing said cards, and latching means operative in response to said locking means and to the displacement of a card in the first of said groups for successively permitting the cards in the successive ones of said groups to be selectively displaced, and for locking all others of said groups of cards.

11. In a digit recording apparatus, a plurality of groups of displaceable number cards, a plurality of electromagnets common to said groups, a plurality of code bars selectively actuatable by said electromagnets for selecting one of the cards in each of said groups, locking means normally preventing the displacement of any of said cards and operable by any of said electromagnets to permit the displacement of said cards, latching means normally locking all but the first of said groups of cards and operative in response to the selective displacement of one of the cards in the first of said groups for unlocking the second of said groups and for locking the first of said groups and thereafter operable successively to unlock said groups of cards.

12. In a digit recording apparatus, a plurality of groups of number cards, one group for each of a plurality of digits to be recorded, means for selectively displacing one of the number cards from each of the successive ones of said groups, actuating means, restoring means actuatable to restore the selected cards, and means for connecting said actuating means to said restoring means.

13. In a digit recording apparatus, a plurality of groups of cards, one group for each of a plurality of digits to be recorded, selecting means common to said groups for selectively displacing a card in each of the successive ones of said groups, actuating means, restoring means actuatable to restore the selected cards, and means including an electromagnet for connecting said actuating means to said restoring means.

14. In a digit recording apparatus, a plurality of groups of cards, selecting means including a plurality of electro-magnets for selectively displacing a card in each of said groups, restoring apparatus actuatable to restore the displaced cards, means conditioning said restoring apparatus and energizing said electromagnets, and means controlled by said electromagnets for actuating said restoring apparatus.

15. In a digit recording apparatus, a plurality of groups of cards, a plurality of electromagnets, a plurality of code bars operable by said electromagnets to permit the selective displacement of a card in each of said groups, a locking bar displaceable by the operation of any of said electromagnets, a restoral bar, electromagnetically operable means for locking said code bars, for linking said restoral bar to said locking bar and for operating said electromagnets whereby said locking bar and said restoral bar are displaced, and a restoral member operative in response to the displacement of said restoral bar for restoring the displaced ones of said cards.

JOHN M. MELICK.

References Cited in the file of this patent

UNITED STATES PATENTS

| Number | Name | Date |
|---|---|---|
| Re. 20,462 | Kleinschmidt | Aug. 3, 1937 |
| 1,026,779 | Woodruff | May 21, 1912 |
| 1,418,702 | Dippel | June 6, 1922 |
| 2,149,343 | Hubbard | Mar. 7, 1939 |
| 2,329,782 | Panissidi | Sept. 21, 1943 |
| 2,452,568 | Harrison | Nov. 2, 1948 |